(12) United States Patent
Mascarenhas et al.

(10) Patent No.: US 9,258,744 B2
(45) Date of Patent: Feb. 9, 2016

(54) SHARING OF NETWORK RESOURCES WITHIN A MANAGED NETWORK

(75) Inventors: Patrick Mascarenhas, Marietta, GA (US); Ming-Ju Ho, Alpharetta, GA (US)

(73) Assignee: AT&T MOBILITY II, LLC, Atlanta, GA (US)

( * ) Notice: Subject to any disclaimer, the term of this patent is extended or adjusted under 35 U.S.C. 154(b) by 147 days.

(21) Appl. No.: 13/597,308

(22) Filed: Aug. 29, 2012

(65) Prior Publication Data
US 2014/0066013 A1    Mar. 6, 2014

(51) Int. Cl.
*H04W 28/26* (2009.01)
*H04W 12/04* (2009.01)
*H04W 12/06* (2009.01)

(52) U.S. Cl.
CPC .............. *H04W 28/26* (2013.01); *H04W 12/04* (2013.01); *H04W 12/06* (2013.01)

(58) Field of Classification Search
CPC ... H04W 72/12; H04W 76/021; H04W 16/14; H04W 28/16; H04W 72/005; H04L 67/1095; H04L 67/1002
See application file for complete search history.

(56) References Cited

U.S. PATENT DOCUMENTS

| 7,171,460 | B2 | 1/2007 | Kalavade et al. |
| 7,603,107 | B2 | 10/2009 | Ratert et al. |
| 7,610,062 | B2 | 10/2009 | Beeman et al. |
| 7,620,386 | B2 | 11/2009 | Wood |
| 7,680,491 | B2 | 3/2010 | Zabawskyj et al. |
| 7,707,412 | B2 | 4/2010 | Nyberg et al. |
| 7,822,439 | B2 | 10/2010 | Teicher |
| 7,953,445 | B2 | 5/2011 | Brown |
| 7,965,827 | B2 | 6/2011 | Myers et al. |
| 8,082,005 | B1 | 12/2011 | Craven |
| 8,200,736 | B2 | 6/2012 | Shi et al. |
| 8,510,808 | B2 * | 8/2013 | McNeil et al. ................ 726/5 |
| 2004/0210767 | A1 * | 10/2004 | Sinclair et al. ................ 713/201 |
| 2005/0054354 | A1 * | 3/2005 | Roman et al. ................ 455/459 |
| 2008/0214200 | A1 * | 9/2008 | Grandblaise .......... H04W 16/14 455/452.2 |
| 2008/0250408 | A1 * | 10/2008 | Tsui et al. ................ 718/100 |
| 2009/0215411 | A1 * | 8/2009 | Tucker et al. ................ 455/90.2 |
| 2010/0058054 | A1 * | 3/2010 | Irvine ................ 713/165 |
| 2010/0195610 | A1 * | 8/2010 | Zhong ................ H04L 65/1016 370/329 |
| 2010/0311391 | A1 | 12/2010 | Siu et al. |
| 2011/0003590 | A1 | 1/2011 | Yoon et al. |
| 2011/0177843 | A1 | 7/2011 | Liu |
| 2012/0281637 | A1 * | 11/2012 | Junell ................ H04W 16/14 370/329 |
| 2012/0302272 | A1 * | 11/2012 | Hakola ................ H04W 72/10 455/509 |

* cited by examiner

*Primary Examiner* — Liton Miah
(74) *Attorney, Agent, or Firm* — Guntin & Gust, PLC; Ed Guntin (57) ABSTRACT

A system that incorporates teachings of the subject disclosure may include, for example, a processor which when executing computer instructions performs the operations including receiving network operator-approved credentials associated with a first communications device. Pre-assigned network resources are accessible by the first communications device by way of the network operator-approved credentials. The processor also performs operations including replicating the network operator-approved credentials, and receiving a request from a second communications device for access to the pre-assigned network resources of the first communications device. A copy of the replicated network operator-approved credentials is forwarded to enable the second mobile device to access the pre-assigned network resources. Other embodiments are disclosed.

20 Claims, 8 Drawing Sheets

SHARING OF NETWORK RESOURCES WITHIN A MANAGED NETWORK

FIELD OF THE DISCLOSURE

The subject disclosure relates generally to sharing of pre-assigned resources within a managed network.

BACKGROUND

Presently, access to privately managed mobile communications networks, such as cellular radio networks, requires that users subscribe to a service plan with a carrier network provider. Service plans can include access to services, such as, voice, text messaging, and data. Pricing of such service plans typically set limits on delivery volumes per service during a given billing period. For example, a plan subscriber might be allotted a budget of voice minutes, text messages, and/or megabytes of data per month. A subscriber's usage of the various subscribed services would generally be tracked by the carrier network provider for billing purposes.

Access to such privately managed mobile communications networks includes certain precautions such that services are restricted to authorized subscribers. For example, a subscriber registers a mobile communications device, such as a mobile phone, with the service provider. Through various protocols and as a result of the registration and/or personalization process, the service provider is able to provide access to the subscribed services automatically, without a subscriber having to manually register or login. Registration can include identification of a Subscriber Identification Module (SIM) associated with a particular mobile communications device.

A SIM can include a unique and reliable means of identification, such as an Integrated Circuit Card Identifier (ICCID). The ICCID is stored on the SIM and can also be engraved on the SIM module. The ICCID is defined by the ITU-T recommendation E.118 as a "primary account number." SIMs are also identified on a carrier network by a unique International Mobile Subscriber Identity (IMSI). The IMSI identifies a mobile country code, a mobile network code, and a Mobile Subscriber Identification Number (MSIN). Such information can be used to coordinate network access and billing, such that subscribers of one network can obtain services through a separately managed mobile communication network. The SIM can also include an authentication key ($K_i$), assigned by a mobile operator during a registration and/or personalization process. The authentication key can also be stored by the carrier network and used to automatically authorize access to a subscriber associated with the authentication key.

Some service plans accommodate other features, such as registration of more than one device for a subscriber, e.g., a mobile phone and a tablet computer, or sharing of network resources among multiple subscribers, e.g., family members, under the service plan.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments of techniques for sharing pre-assigned network resources of a managed network. Other embodiments are included in the subject disclosure.

One embodiment of the subject disclosure includes a process including receiving, by a system comprising a processor, mobile network operator-approved credentials associated with a first mobile device. Pre-assigned mobile network resources are accessible by the first mobile device by way of the mobile network operator-approved credentials. The process includes replicating, by the system, the mobile network operator-approved credentials. The process further includes receiving, by the system, a request from a second mobile device for access to the pre-assigned mobile network resources of the first mobile device. An identification of the second mobile device is received by the system and a copy of the replicated mobile network operator-approved credentials is forwarded to enable the second mobile device to access the pre-assigned mobile network resources.

One embodiment of the subject disclosure includes a system including a memory storing computer instructions, and a processor coupled to the memory. The processor, responsive to executing the computer instructions, is operable to perform operations including receiving network operator-approved credentials associated with a first communications device. Pre-assigned network resources are accessible by the first communications device by way of the network operator-approved credentials. The processor is also operable to replicate network operator-approved credentials are and to receive a request from a second communications device for access to the pre-assigned network resources of the first communications device. The processor is further operable to receive identification of the second communications device and to forward a copy of the replicated network operator-approved credentials to enable the second mobile device to access the pre-assigned network resources.

One embodiment of the subject disclosure includes a computer-readable storage medium including computer instructions which, when executed by at least one processor, cause the at least one processor to perform operations including receiving network operator-approved credentials associated with a first communications device. Pre-assigned network resources are accessible by the first communications device by way of the network operator-approved credentials. The network operator-approved credentials are replicated. The processor, when executing the computer instructions is operable to receive a request from a second communications device for access to the pre-assigned network resources of the first communications device, and to forward a copy of the replicated network operator-approved credentials to enable the second mobile device to access the pre-assigned network resources.

Figure 1:
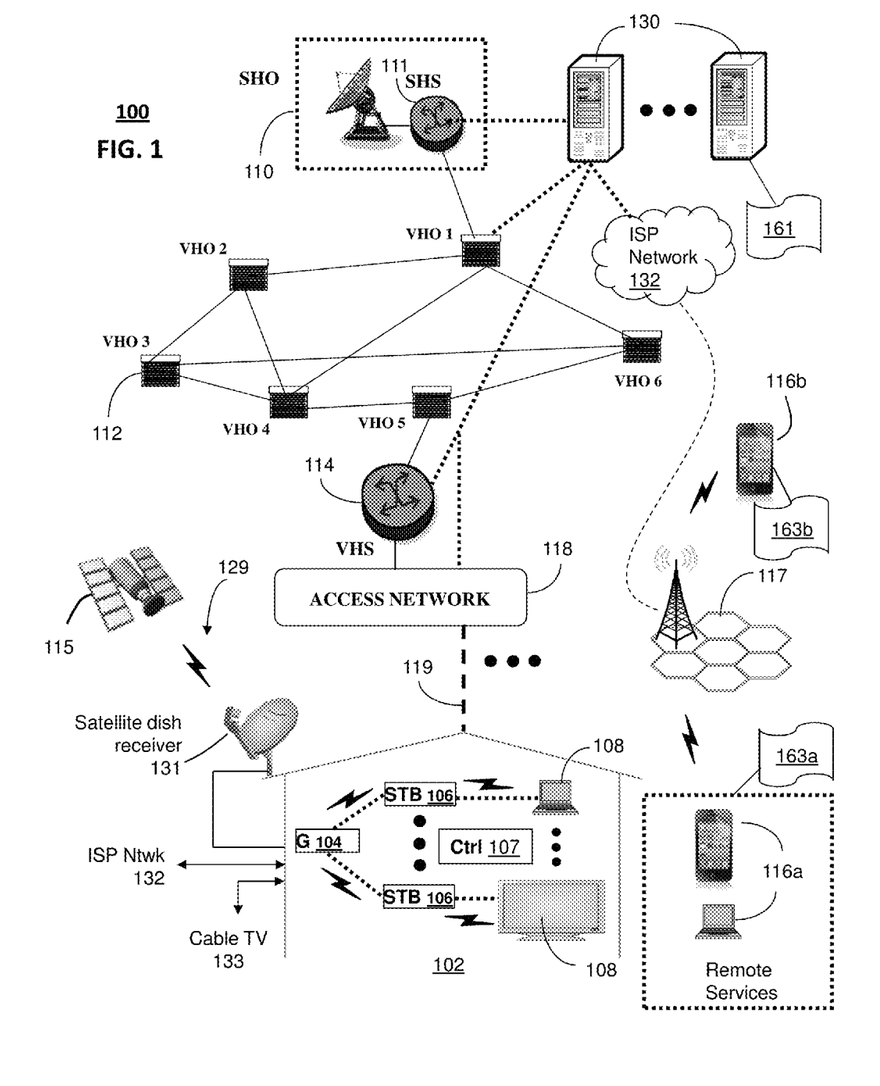
FIGS. 1-2 depict illustrative embodiments of communication systems that provide media services.

FIG. 1 depicts an illustrative embodiment of a first communication system 100 for delivering media content. The system 100 allows for receiving by wireless access base station 117 credentials associated with a first wireless communications device 116a. Pre-assigned network resources are accessible by the first wireless communications device 116a by way of operator-approved credentials. The system 100 allows for replication of the operator-approved credentials, such that they can be forwarded to a second wireless communications device 116b responsive to a request made by the second device 116b through the base station 117 for access to the pre-assigned network resources. The second wireless communications device 116b having received a copy of the replicated operator-approved credentials, is able to access the pre-assigned mobile network resources of the first wireless communications device 116a through the base station 117.

The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used in the media system of FIG. 1. The satellite broadcast television system can be overlaid, operably coupled with, or replace the IPTV system as another representative embodiment of communication system 100. In this embodiment, signals transmitted by a satellite 115 that include media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to an Internet Service Provider (ISP) network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

The subject disclosure can apply to other present or next generation over-the-air and/or landline media content services system.

Some of the network elements of the IPTV media system can be coupled to one or more computing devices 130, a portion of which can operate as a web server for providing web portal services over the ISP network 132 to wireline media devices 108 or wireless communications devices 116.

The communication system 100 can also provide for all or a portion of the computing devices 130 to function as a manager for sharing pre-assigned network resources (herein referred to as sharing server 130). The sharing server 130 can use computing and communications technology to perform function 161, which can include among other things, replicating network-access credentials obtained from a first wireless communications device 116a, and providing the replicated credentials to a second wireless communications device 116b, such that the second device 116b can access or otherwise share network resources pre-assigned to the first wireless communications device 116a. The media processors 106 and wireless communications devices 116a, 116b can be provisioned with software functions 163a, 163b to utilize the services of sharing server 130.

Multiple forms of media services can be offered to media devices over landline technologies such as those described above. Additionally, media services can be offered to media devices by way of the wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 2:
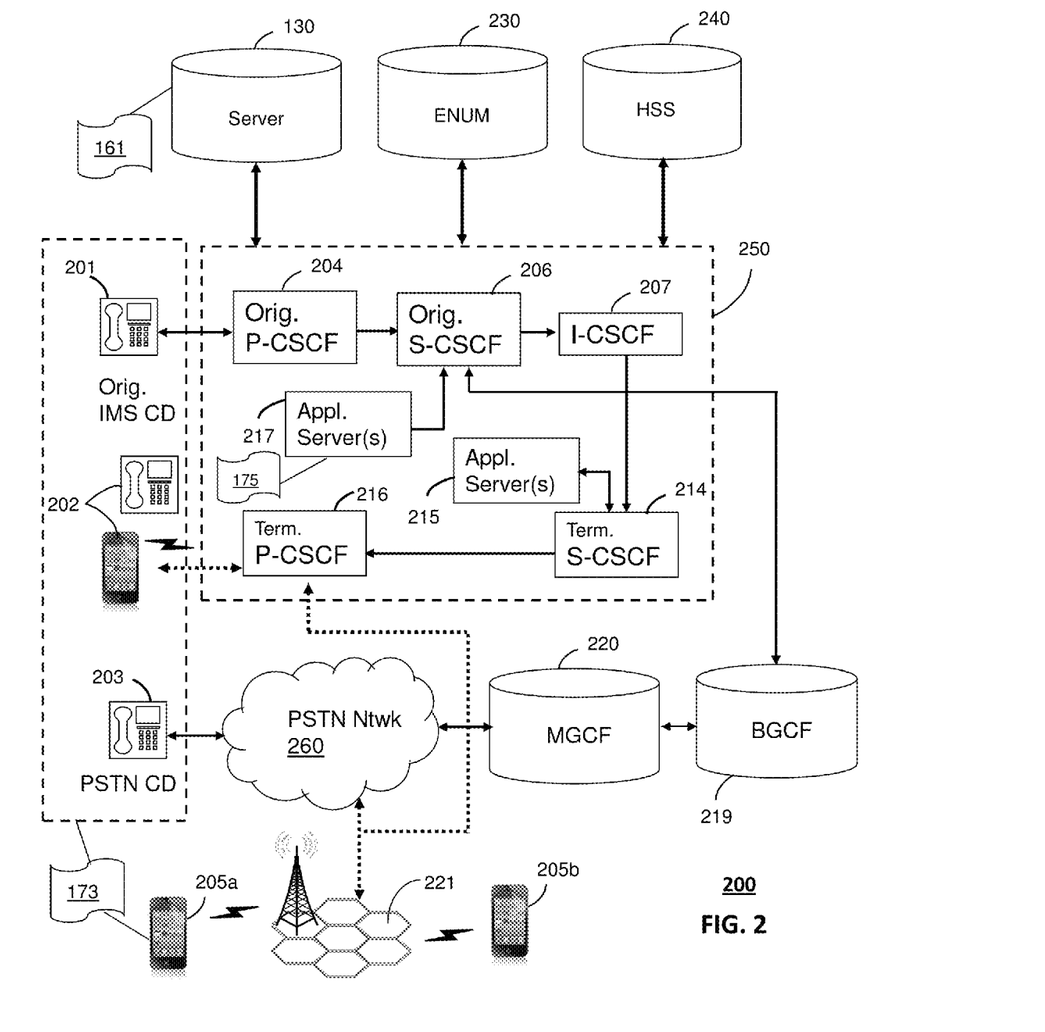

FIG. 2 depicts an illustrative embodiment of a communication system 200 employing an IP Multimedia Subsystem (IMS) network architecture to facilitate the combined services of circuit-switched and packet-switched systems. The communication system 200 allows for receiving requests from a mobile device over a cellular network for delivery of a data service, such as a streaming video application service, such as IPTV or VOD. As will be described in more detail below, the system 200 further allows for receiving by a cellular base station 221 credentials associated with a first wireless communications device 205a. Pre-assigned network resources are accessible by the first wireless communications device 205a by way of operator-approved credentials. The system 200 allows for replication of the operator-approved credentials, such that they can be forwarded to a second wireless communications device 205b responsive to a request made by the second device 205b through the cellular base station 221 for access to the pre-assigned network resources. The second wireless communications device 205b having received a copy of the replicated operator-approved credentials, is able to access the pre-assigned mobile network resources of the first wireless communications device 205a through the cellular base station 221. The communication system 200 can be overlaid or operably coupled with the communication system 100 (FIG. 1) as another representative embodiment of the communication system 100.

The communication system 200 can comprise a Home Subscriber Server (HSS) 240, a tElephone NUmber Mapping (ENUM) server 230, and other network elements of an IMS network 250. The IMS network 250 can establish communications between IMS-compliant communications devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services. Alternatively or in addition, the application servers 217 can be adapted with software to perform a sharing function 175 to utilize the services of the sharing server 130.

Additionally, the originating S-CSCF 206 can submit queries to the ENUM system 230 to translate an E.164 telephone number in the SIP INVITE message to a SIP Uniform Resource Identifier (URI) if the terminating communications device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that the communication system 200 can be adapted to support video conferencing. In addition, the communication system 200 can be adapted to provide the IMS CDs 201, 202 with the multimedia and Internet services of the communication system 100 of FIG. 1.

If the terminating communications device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a Digital Enhanced Cordless Telecommunications (DECT) base unit, or another suitable wireless access unit to establish communications with the IMS network 250 of FIG. 2. The cellular access base station 221 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 2.

Cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The sharing server 130 of FIG. 1 can be operably coupled to the second communication system 200 for purposes similar to those described above. The sharing server 130 can perform function 161 and thereby provide sharing of pre-assigned network services between the wireless CDs 205a, 205b of FIG. 2. The wireless CDs 205a, 205b, which can be adapted with software to perform a sharing function 173 to utilize the services of the sharing server 130. The sharing server 130 can be an integral part of the application server(s) 217 performing the sharing function 173, which can be substantially similar to the sharing function 161 and adapted to the operations of the IMS network 250.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 3:
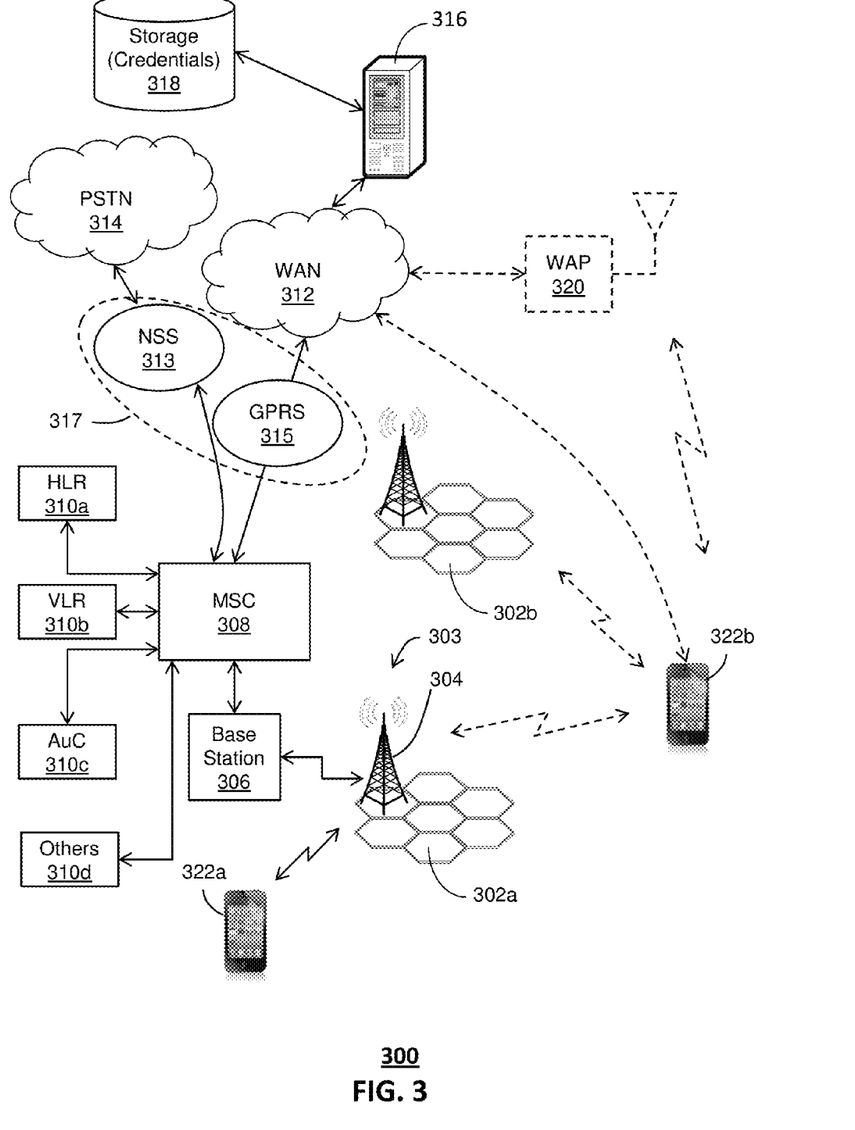
FIG. 3 depicts an illustrative embodiment of a system that supports sharing of pre-assigned network resources.

FIG. 3 depicts an illustrative embodiment of a wireless communication system 300. The communication system 300 includes a first mobile network, sometimes referred to as a cellular network 302a. The cellular network 302a includes a number of mobile stations, or cell sites 303, each including at least one antenna 304 providing wireless coverage within a respective range. The antenna is coupled to a base station 306 that is in further communication with a mobile switching center 308. The base station 306 can include a base station radio transceiver for terminating one end of a radio link between the cell site 303 and the mobile communications device 322a. The base station 306 also includes a base station controller in communication with one or more of the mobile switching center 308 and a packet switched controller.

The mobile switching center 308 is in further communication with a core circuit switched network, also referred to as a Network Switching Subsystem (NSS) 313 and a core packet switched network 315. An example of an NSS 313 is the Global System for Mobile communications (GSM) core network, suitable for handling voice calls and text. The NSS 313 can be in further communication with another circuit-switched network such as the Public Switched Telephone Network (PSTN) 314. An example of the core packet switched network is the general packet radio service (GPRS) core network 315, which allows 2G, 3G and WCDMA mobile networks to transmit IP packets to external networks, such as the Internet.

The NSS 313 carries out call switching and mobility management functions for mobile phones roaming among cell sites 303 of the cellular network 302a. In at least some embodiments, the mobile switching center 308 is in further communication with a packet switched network, shown in the illustrative example as a Wide Area Network (WAN) 312, such as the Internet. The packet switched network 312 is suitable for handling mobile data.

The base station 306 generally handles radio communications with one or more mobile phones 322a, which can include, for example, 2G and 2.5G mobile phones. Alternatively or in addition, the base station 306 handles radio communications with 3G mobile phones 322a according to a Universal Mobile Telephone System (UMTS) Terrestrial Radio Access Network (UTRAN).

The mobile switching center 308 can include a server in communication with one or more network elements. Examples of such network elements include a Home Location Register (HLR) 310a, a Visitor Location Register (VLR) 310b, and an Authentication Center (AuC) 310c.

The HLR 310a is a central database that contains details of each mobile phone subscriber that is authorized to use the GSM core network. The HLR 310a can store details of SIM cards issued by the mobile phone operator. Each SIM has a unique identifier called an International Mobile Subscriber Identity (IMSI), which can serve as a primary key to each HLR record. Another data item associated with the SIM is a Mobile Subscriber Integrated Services Digital Network Number (MSISDN), which is a telephone number used by mobile phone to make and receive calls. The HLR data can be stored for as long as a subscriber remains with the mobile service provider. Other information that can be stored in the HLR against an IMSI record includes details of mobile services that the subscriber has requested or been given, referred to herein as pre-assigned network resources.

The Visitor Location Register (VLR) 310b is a database of mobile phone subscribers who have roamed into the jurisdiction of the mobile switching center 308. Each base station 306 in the mobile network 302a can be served by one VLR 310b, such that a mobile subscriber cannot be present in more than one VLR 310b at a time. Data stored in the VLR 310b can be obtained from the HLR 310a or collected from the mobile station 303. Information stored within the VLR 310b includes one or more of the subscriber's identity number (IMSI), authentication data the subscriber's phone number, network services that the subscriber is allowed to access, an HLR address of the subscriber.

In operation, VLR 310b connects to the mobile switching center 308 to pass required data for its procedures, such as authentication or call set-up. The VLR 310b connects to the HLR 310a to request data for mobile phones 322a attached to its serving area. The VLR 310b also connects to other VLRs to transfer temporary data concerning the mobile device, when roaming into new VLR areas.

The AuC 310c provides authentication for each user that attempts to connect to the core network 317, e.g., collectively the NSS 313, or equivalent, and the GPRS 315, or equivalent. In present systems, the AuC 310c authenticates each SIM card that attempts to connect to the core network 317. In at least some embodiments, the AuC 310c participates in a security process together with the MSC 308, for example, depending upon a shared secret between the AuC 310c and the SIM, called the $K_i$. The $K_i$ is a value "burned" into the SIM during manufacture that can be securely replicated onto the AuC 310c. The $K_i$ need not be transmitted between the AuC 310c and the SIM, but can be combined with the IMSI to produce a challenge/response for identification purposes and an encryption key, $K_c$, for use in over the air communications.

The mobile switching center 308 is in further communication with a sharing server 316, for example, through the WAN 312. The sharing server 316 can be coupled to an electronically accessible storage 318, as shown. In at least some embodiments, the communication system 300 includes at least one additional wireless access point (WAP) 320, for example, in communication with the WAN 312. In at least some embodiments, the WAP 320 includes a wireless local area network based on the Institute of Electrical and Electronics Engineers' (IEEE) 802.11 standards, sometimes referred to as "WiFi." The communication system 300 supports communications with a second mobile communications device, such as a second cell phone 322b, through one or more wireless links to the first mobile station 303, to another mobile station of second mobile network 302b, or to the WAP 320. Alternatively or in addition, the communication system 300 supports communications between the second mobile communications device 302b and the sharing server 316 through a wired connection to the WAN 312.

Other support functions 310d connected to the MSC 308 include a billing center, a short message services center a multimedia messaging services center, and voice mail systems. The billing center is responsible for processing toll tickets generated by the VLRS and HLRs and generating a bill for each subscriber, and generating billing data for roaming subscribers. The short message service center supports the sending and receiving of text messages; whereas, the multimedia messaging service center supports the sending and receiving of multimedia messages, such as images, audio, video, and combinations of one or more of images, audio and video. The voicemail system records and records voicemail.

In the illustrative example, the first mobile communications device 302a belongs to a subscriber, or primary user, who maintains a subscription and a billing record with the mobile network service provider. The second communications device 302b can be another device of the primary user, or of another individual who may or may not be primarily connected to the same mobile network. The other devices can be identified by an identifying feature associated with the respective device. Such identifying features can include one or more of the device's assigned phone number, such as a ten-digit phone number, an Electronic Serial Number (ESN) and/or International Equipment Mobile Identity (IEMI), tied to the device itself and not subject to change, as in the device's phone number. Such electronic identifiers have been widely adopted by the telecommunications industry to uniquely identify mobile devices. ESNs include one or more of 11-digit decimal numbers, 8 digit hexadecimal numbers, or other formats, such as the MIED, a superset of the IEMI created by 3GPP2.

In at least some embodiments, the sharing server 316 includes a website portal that allows a primary user to re-allocate their pre-assigned network resources, e.g., minutes and/or bytes, to other devices of the primary user and/or to other user's devices. The sharing server 316 can include security features to prevent unauthorized access or tampering. In at least some embodiments, the sharing server 316 can be maintained as a secure Internet portal 316 with authentication capabilities. The secure Internet portal 316 can be maintained in the cloud. The sharing server or portal 316 can provide the primary user with access to information including their updated profile, indicating minutes/bytes used and available at any given time. Accordingly, the primary user can track and monitor their available or remaining minutes/bytes.

Credentials of the primary user and/or the primary user's device associated with a subscription can be replicated through the sharing server 316. Such replicated credentials can be made available through the sharing server 316 and under the control of the primary user. In at least some embodiments, the replicated credentials can be distributed through soft or hard copy, which can then be placed on one or more other devices, e.g., secondary users, thereby allowing access by the secondary users to a shared allotment of the primary user's minutes/bytes. The shared allotment can also be tracked and monitored by the primary user, and in at least some instances, the secondary user, through the sharing server 316.

According to techniques disclosed herein, one or more devices using copies of the subscriber's credentials can use the service provider's network sequentially or simultaneously. To facilitate usage monitoring, an additional identification tag can be assigned with each copy of the credentials distributed to other shared devices. This tag can include a reference that can include all or part of the shared device's ten-digit telephone number, ESN, IEMI, MIED, and the like. Alternatively or in addition, the tag can include a reference identifier, such as a number, assigned by the network operator through the sharing server 316.

The primary user can provide the services/minutes/bytes to a secondary user with a compatible device, which may make use of a physical and/or virtual SIM. The compatible device can be an "unlocked" device for non-subscribers, allowing the compatible device to swap SIMs. For example, a subscriber can provide a visitor from a foreign country or region, such as Europe, to with a sufficient amount of voice minutes to facility communication while meeting the visitor for a brief period, e.g., while at an airport, or during their entire visit.

Alternatively or in addition, by way of marketing and sales promotions, a carrier network provider can demonstrate their services to potential users, by sharing access to one or more services provided by the network according to sharing techniques disclosed herein. Thus, a potential future subscriber can enjoy and otherwise explore the service provider's network capabilities according to temporary shared access granted by the service provider. This might include a number of calls, data transfers, and/or duration of usage (e.g., 1 hour, 4 hours, or 24 hours) for one or more of such services (e.g., voice, data). Such features would allow potential subscribers to experience network performance in various locations not restricted to the point of sales. Thus, a service provider can demonstrate network features at a potential future subscribers home and/or school or place of business, or other locations where network connectivity is considered important to the user (e.g., on their golf course). It is understood that such shared access can also be granted by others as part of a promotion, rewards program, or marketing campaign.

According to the techniques disclosed herein, a primary user can access the sharing server 316 to provide one or more other secondary users, such as friends or family, with the ability to access the subscriber's pre-assigned network resources. In at least some embodiments, the primary user can provide limits on such shared access. For example, the primary user can limit sharing to a number of voice minutes, data transfer bytes, text messages, downloaded media items, such as songs, videos, ring-tones, call-back tones, or any other subset of the subscriber's pre-assigned network services provided under the subscriber's service plan.

The primary user can provide a shared user with a select amount of minutes of voice calls, or set bytes, for example using Voice over Internet Protocol (VoIP) of voice calls. Sharing can also be subject to other constraints, such as one or more of dollar amounts, locations, time limits and content restrictions. Thus, a secondary user's shared access may expire or otherwise be unusable upon a date (e.g., not available after ten days, or until the $15^{th}$ of the month) and/or time limit (e.g., not available during weeknights after 10 p.m.).

A billing center creates a billing record that tracks an aggregate usage of each of the various services covered under the subscription. Alternatively or in addition, the billing record also tracks usage of each of the various services according to one or more shared devices. Thus, a subscriber can be provided with a detailed billing record to allow for tracking of usage of network resources, which can be helpful in determining future sharing arrangements and/or upgrades or modifications to the underlying subscription.

Figure 4:
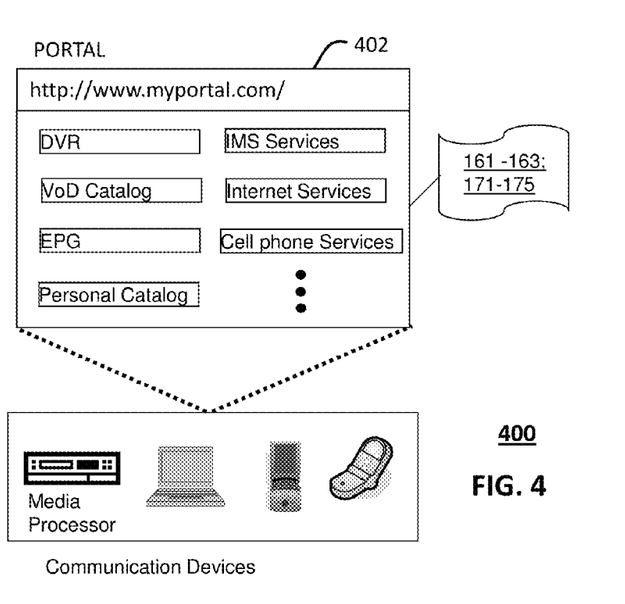
FIG. 4 depicts an illustrative embodiment of a web portal for interacting with the communication systems of FIGS. 1-3.

FIG. 4 depicts an illustrative embodiment of a web portal 402 which can be hosted by server applications operating from the computing devices 130 of the communication system 100 illustrated in FIG. 1. The portal system 400 allows for interaction with communication systems, such as those systems 100, 200 and 300 illustrated in FIGS. 1-3. Such controlled interaction can include receiving requests from a mobile device over a cellular network for delivery of a data service (e.g., a streaming video application service, such as IPTV or VOD) through network resources pre-assigned to another mobile device, or mobile subscriber. As described herein, the systems 100, 200 and 300 allow for receiving operator-approved credentials associated with a first wireless communications device, wherein the credentials are required for access to pre-assigned network resources. The systems 100, 200 and 300 further allow for replication of the operator-approved credentials, such that they can be forwarded to another wireless communications device, for example, responsive to a request made by the second device. The other wireless communications device having received a copy of the replicated operator-approved credentials is able to access the pre-assigned mobile network resources. The portal 402 can be used, for example, to control parameters related to implementation of such sharing features, as in software applications 161, 163, 173 and 175, to allow a subscriber to re-allocate pre-assigned mobile network resources to one or more other wireless communications devices. Such parameters can include user preferences, such as restrictions on sharing, registration of one or more mobile devices, preferences for determining sharing of pre-assigned network resources, and the like.

The web portal 402 can be used for managing services of communication systems 100-300. A web page of the web portal 402 can be accessed by a Uniform Resource Locator (URL) with an Internet browser such as Microsoft's Internet Explorer™, Mozilla's Firefox™, Apple's Safari™, or Google's Chrome™ using an Internet-capable communications device such as those described in FIGS. 1-3. The web portal 402 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 402 can also be used for provisioning IMS services described earlier, provisioning Internet services, provisioning cellular phone services, and so on.

Figure 5:
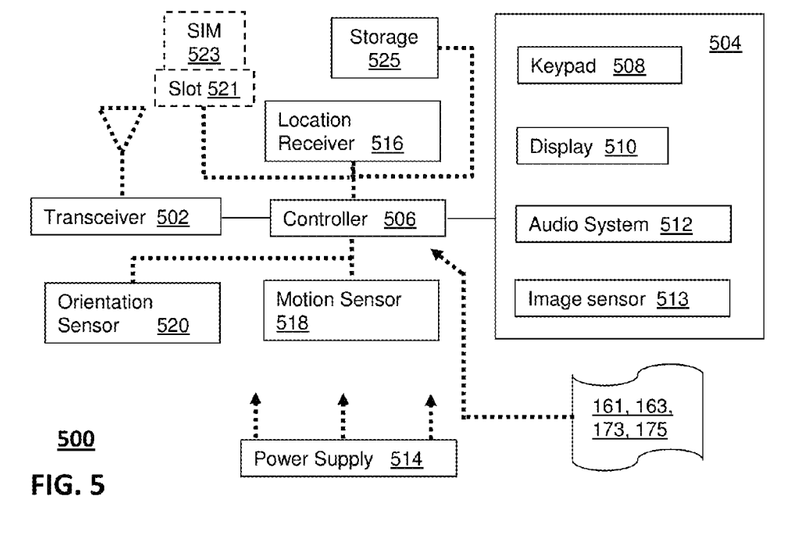
FIG. 5 depicts an illustrative embodiment of a communications device utilized in the communication systems of FIGS. 1-3.

FIG. 5 depicts an illustrative embodiment of a communications device 500. The communications device 500 can serve in whole or in part as an illustrative embodiment of the devices depicted in FIGS. 1-3, including the wireless communications devices 116*a*, 116*b*, 205*a*, 205*b*. The communications device 500 can comprise a wireline and/or wireless transceiver 502 (herein transceiver 502), a user interface (UI) 504, a power supply 514, a location receiver 516, a motion sensor 518, an orientation sensor 520, storage 525, and a controller 506 for managing operations thereof. The transceiver 502 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communications device 500. The keypad 508 can be an integral part of a housing assembly of the communications device 500 or an independent device operably coupled thereto by a tethered wireline interface (such as a USB cable) or a wireless interface supporting for example Bluetooth. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communications device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communications device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communications device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communications device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communications device 400 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communications device 500 in three-dimensional space. The orientation sensor 520 can utilize orientation sensing technology such as a magnetometer to detect the orientation of the communications device 500 (north, south, west, and east, as well as combined orientations in degrees, minutes, or other suitable orientation metrics).

The communications device 500 can use the transceiver 502 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), and/or a video processor with associated storage memory such as Flash, ROM, RAM, SRAM, DRAM or other storage technologies for executing computer instructions, controlling, and processing data supplied by the aforementioned components of the communications device 500.

Other components not shown in FIG. 5 can be used in one or more embodiments of the subject disclosure. For instance, the communications device 500 can include a reset button (not shown). The reset button can be used to reset the controller 506 of the communications device 500. In yet another embodiment, the communications device 500 can also include a factory default setting button positioned, for example, below a small hole in a housing assembly of the communications device 500 to force the communications device 500 to re-establish factory settings. In this embodiment, a user can use a protruding object such as a pen or paper clip tip to reach into the hole and depress the default setting button. In at least some embodiments, the communications device 500 can include a slot 521 for adding or removing an identity module such as a SIM card 523. SIM cards 523 can be used for identifying subscriber services, executing programs, storing subscriber data, and so forth.

The communications device 500 as described herein can operate with more or less of the circuit components shown in FIG. 5. These variant embodiments can be used in one or more embodiments of the subject disclosure.

The communications device 500 can be adapted to perform the functions of the media processor 106, the media devices 108, or the portable communications devices 116a, 116b of FIG. 1, as well as the IMS CDs 201-202 and PSTN CDs 203-205b of FIG. 2. It will be appreciated that the communications device 500 can also represent other devices that can operate in communication systems 100-300 of FIGS. 1-3 such as a gaming console and a media player.

The communications device 500 shown in FIG. 5 or portions thereof can serve as a representation of one or more of the devices of communication systems 100-300. In addition, the controller 506 can be adapted in various embodiments to perform the functions 161, 163, 173 and 175, respectively. In at least some embodiments, the controller 506 can be configured to request and coordinate access to shared network resources subscribed to by another entity. For example, the controller 506 can generate a request for shared access, providing appropriate identification and/or authorization, and providing access to various services available under any such sharing arrangement. Alternatively or in addition, the controller 506 can be configured to establish sharing arrangement in cooperation with a network service provider. For example, the controller 506 can request that the network service provider share at least a portion of subscribed network services. In at least some embodiments, the communications device 500 includes a SIM containing credentials for accessing network provider services. The controller 506 can request that the credentials obtainable from the SIM be replicated and made available for sharing with one or more other users.

Figure 6:
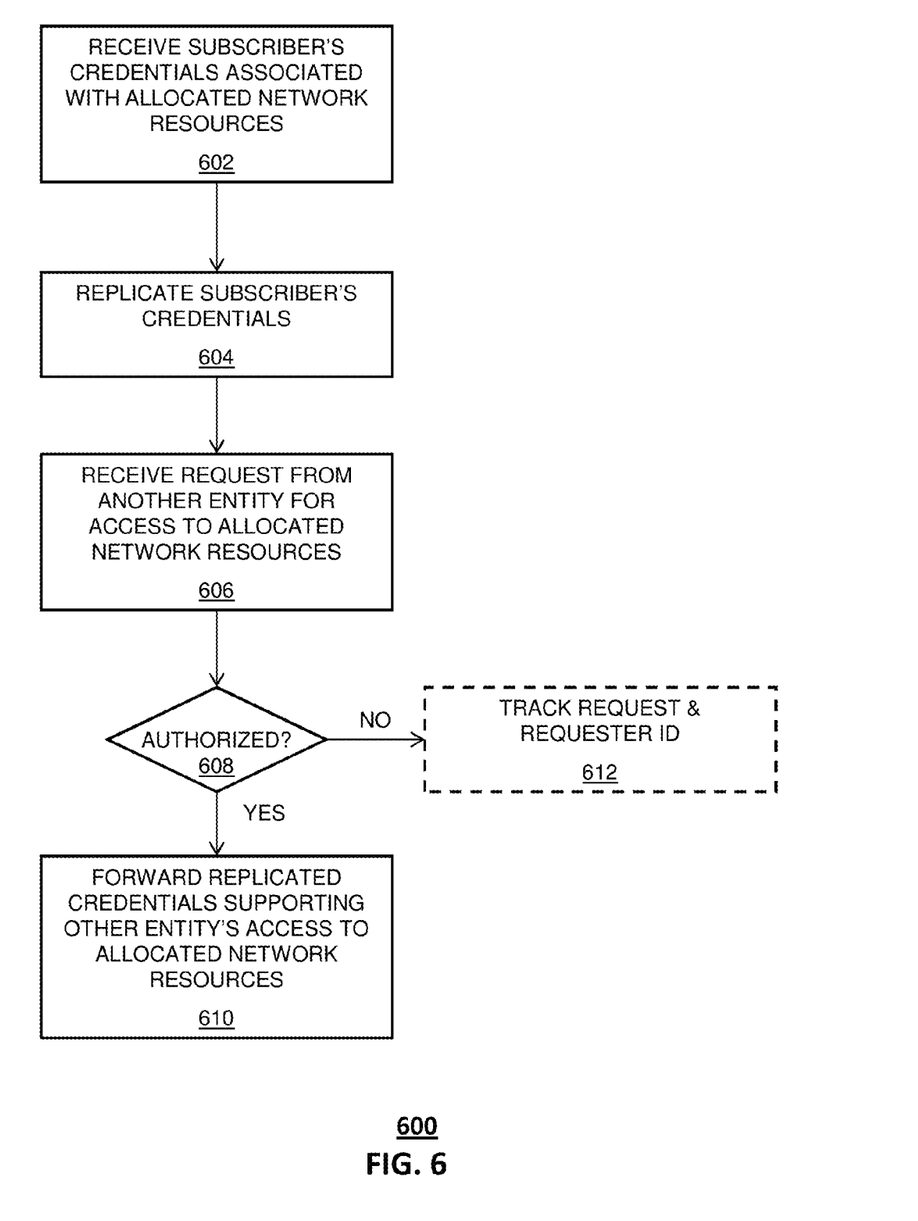
FIG. 6 depicts an illustrative embodiment of a process operating in portions of the systems described in FIGS. 1-5.

FIG. 6 depicts an illustrative sharing process 600 that operates in portions of the devices of FIGS. 1-5. The sharing process 600 can begin with step 602 in which a subscriber's credentials are received. The subscriber's credentials can be associated by the network service provider or mobile carrier with pre-assigned network resources, such as services obtained under a service agreement between the subscriber and the mobile carrier. Examples of such credentials include one or more of ESN, IEMI, MIED, or information obtained from a SIM card, when used by a mobile communications device. Such information can include one or more of the IMSI and the MSISDN, and in at least some instances, a shared secret, $K_i$. Such operator-approved credentials can be provided by the operator, for example, through a SIM provided by the mobile carrier at a point of sale of the mobile communications device, the mobile device itself, and/or an assigned phone number of the mobile device.

One or more of the subscriber's credentials received in Step 602 can be replicated in step 604. The replication can occur within the sharing server 316 (FIG. 3) and the replicated credentials can be stored or otherwise retained for subsequent use without the need for actively communicating with the source mobile communications device. For example, the sharing server 316 can store such replicated credentials in an electronically accessible storage 318 (FIG. 3). Various security measures, such as encryption and access restrictions can be applied to one or more of the processes of storage and retrieval of the replicated subscriber's credentials from the sharing server 316 to guard against unauthorized access, or cloning.

A request is subsequently received by the network service provider, e.g., by way of the sharing server 316, from another entity at step 606 for access to network resources pre-assigned to the subscriber associated with the replicated credentials. For example, another mobile communications device 322b, different from the mobile communications device 322a having the SIM card on record with the mobile network service provider. The other device, sometimes referred to as a secondary user, can be a device of the same subscriber, or of a different subscriber of the same carrier network, a different carrier network, or of a non-subscriber.

A determination is made at step 608 whether the requesting entity is authorized to access the replicated subscriber's credentials. To the extent the second entity making the request is authorized, the replicated subscriber's credentials supporting other entity's access to pre-assigned network resources are forwarded at step 610. This can include forwarding to the requesting device for storage therein, or to another location accessible by the network operator. Otherwise, to the extent the second entity is not authorized to access the pre-assigned network resources, the request optionally be retained along with one or more other indicia of the requesting entity, such as an entity identification at step 612.

The secondary user having access to the subscriber's shared credentials is able to access the carrier network resources subject to restrictions of the subscriber's service plan as well as any additional restrictions placed by the subscriber and/or the service provider.

Figure 7:
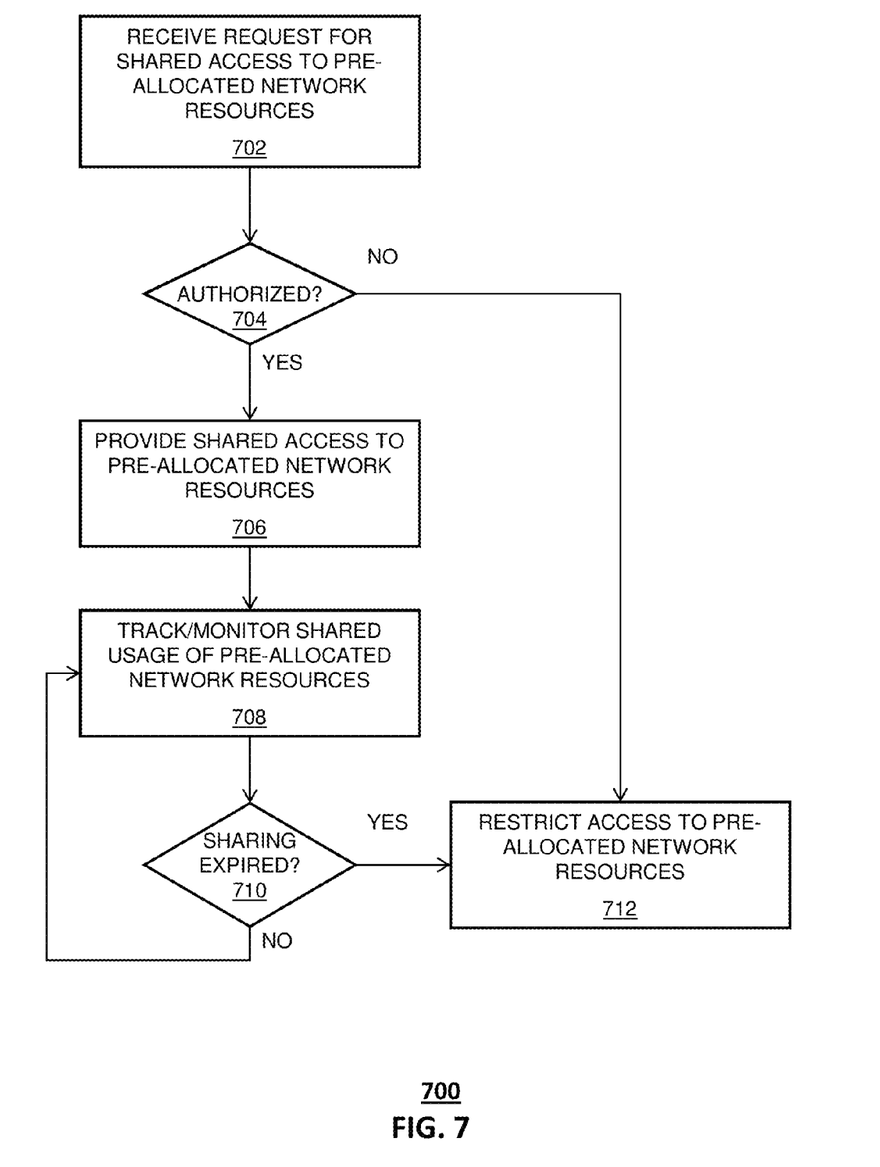
FIG. 7 depicts an illustrative embodiment of another process operating in portions of the systems described in FIGS. 1-5.

FIG. 7 depicts an illustrative method 700 that operates in portions of the devices of FIGS. 1-5. Method 700 can begin with step 702 in which a request for shared access to pre-assigned network resources is received. A determination as to whether the requesting entity is an authorized entity is made by at step 704, for example, by a sharing server 316 (FIG. 3). To the extent the second entity is not authorized to access the pre-assigned network resources, the second entity's access to the shared resources is restricted or otherwise blocked at step 712, for example by one or more of the sharing server 316 or the mobile network operator, for example by way of the base station 306 and/or mobile switching center 308 (FIG. 3). Otherwise, to the extent the requesting second entity is authorized, shared access to pre-assigned network resources is provided at step 706. Shared usage of pre-assigned network resources can be tracked or otherwise monitored at step 708. A determination is made as to whether shared access to pre-assigned network resources of the first entity has expired. To the extent it has, the second entity's access to the shared resources is restricted or otherwise blocked at step 712. Otherwise, access to shared resources continues, such shared usage being monitored at step 708.

Once sharing has been granted to a secondary user, and network usage tracked and/or monitored as in Step 708, such tracked/monitored usage can be compared to sharing limits as may be set by the underlying subscriber. Thus, as in Step 710, a determination can be made as to whether the secondary user has met or otherwise exceeded any sharing limitations. To the extent such limits have been met or exceeded, the secondary user's access to network resources pre-assigned to the subscriber can be blocked. Alternatively or in addition, a message can be sent to the subscriber notifying them that the secondary user has met or exceed their shared network services. In at least some embodiments, such notification messages can be sent to the subscriber in advance of any such limits being met or exceeded, to provide the subscriber with an opportunity to modify sharing parameters, as desired. Thus, a subscriber can choose to increase one or more limits to shared services, once the secondary user has met or exceeded some threshold (e.g., 75%, 90%) of allotted resources, such that the shared user can continue to enjoy shared access beyond any originally established limits, without interruption.

Figure 8:
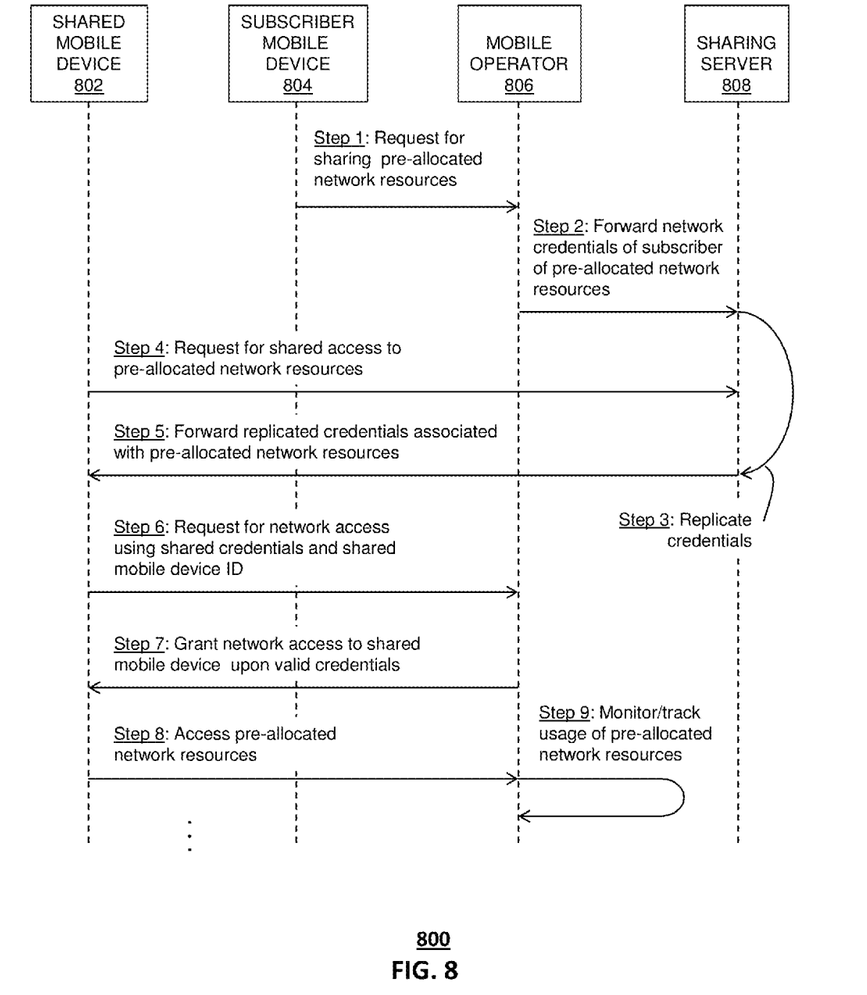
FIG. 8 depicts an illustrative embodiment of another process operating in portions of the systems described in FIGS. 1-5.

FIG. 8 depicts an illustrative process 800 that operates in portions of the devices of FIGS. 1-5. Vertical dashed lines appear under respective devices participating in the sharing process. Included is a subscriber mobile device 802, such as the wireless communications devices 116a (FIG. 1), 205a (FIG. 2) and mobile device 300a (FIG. 3). Also included is a mobile operator 806, such as the mobile switching center 308 (FIG. 3); a sharing server 808, such as the sharing server 130 (FIGS. 1 and 2) and 316 (FIG. 3); and a shared mobile device 802, such as the wireless communications devices 116b (FIG. 1), 205b (FIG. 2) and mobile device 300b (FIG. 3).

The process 800 can begin with a first entity, in this instance, the subscriber mobile device 804 for which the subscriber has obtained from the carrier network pre-assigned network resources. The subscriber mobile device 804 can include a mobile phone, a smart phone, a tablet computer, a notebook or netbook computer, a workstation, a set-top box, or a game controller or game console. As disclosed herein, the pre-assigned network resources can include respective quantities of one or more of voice minutes, text messages and data transfer and/or storage provided by a carrier network to the subscriber. Other measures of pre-assigned network resources include one or more of media items, such as songs, movies, games, ringtones, and the like. Such services are generally obtained or otherwise provided under the parameters of a network usage agreement or plan, under which the mobile network service provider provisions sufficient network resources. The shared mobile device 802 can represent another mobile device of the same subscriber, or a device of another user who may or may not also be a subscriber under a separate plan.

In the illustrative example, the subscriber mobile device 804 establishes a sharing capability by submitting a request for sharing pre-assigned network resources to the mobile operator 806 at Step 1. Such a request can be made in person, for example at a retail outlet of the carrier network provider, by a voice telephone call to a representative of the carrier network provider, or through a website or portal providing access to such plan-management features. Alternatively or in addition, the request for sharing can be made directly from the subscriber mobile device 804, for example, by dialing and/or texting a number. The mobile operator 806, in turn, forwards credentials of the subscriber mobile device 804 desiring to share pre-assigned network resources to the sharing server 808 at Step 2. The credentials can include SIM information associated with the subscriber mobile device. Such SIM information can be obtained directly from a SIM installed within the subscriber mobile device, or by reference using an identification of the SIM, such as the International Mobile Subscriber Identity (IMSI). Other information from the SIM can be obtained directly from the module, for example, over the carrier network, or by reference to a stored association of such information maintained by or otherwise accessible by the carrier network provider.

The sharing server 808 replicates one or more of the credentials obtained either directly or indirectly from the SIM of the subscriber mobile device 804 at Step 3. Once replicated, the credentials can be stored either locally or remotely by the sharing server 808. Such storage is preferably secured to protect it from unauthorized access by an unauthorized entity desiring access to such pre-assigned network resources.

Another entity, referred to here as a shared mobile device 802, seeking access to the pre-assigned network resources of the subscriber mobile device 804, requests from the sharing server 808 shared access to the pre-assigned network resources at Step 4. In some embodiments, the sharing server 808, having retained the replicated credentials of the subscriber mobile device 804, forwards the replicated credentials to the shared mobile device 802 at Step 5. The shared mobile device 802, in turn, requests access to the carrier network from the mobile operator 806 at Step 6. The mobile operator 806, responsive to receiving the request, determines validity of the replicated credentials, availability of pre-assigned network resources, and if valid and available, grants network access to the shared mobile device 802 at Step 7.

The shared mobile device 802, having obtained access to the subscriber's network and shared pre-assigned network resources, accesses network services at Step 9. The mobile operator 806 monitors and/or tracks usage by the shared mobile device 802 at Step 9. In at least some embodiments, the mobile operator 806 bills the subscriber for services consumed by the shared mobile device 802 according to records obtained by the monitoring and/or tracking of Step 9.

By way of illustrative example, a subscriber provides credentials to a shared server, or portal 316 along with instructions to share one or more subscribed to services with another entity, referred to herein as a secondary user. The secondary user can include another device of the subscriber or a device of another individual. Along with the sharing instructions, the subscriber can provide an identifier of the secondary user. This can include a serial number of another device of the secondary user, such as an ESN, IEMI, MIED, and/or a phone number associated with the other device. Alternatively or in addition, the subscriber can provide other means of security, such as a password, or passphrase, or encryption key parameter to be presented by the secondary user before access to any shared network services is granted. As disclosed herein, the subscriber may choose to set certain limitations associated with shared access.

The secondary user is notified as to the availability of shared network services reserved on their behalf by the subscriber. This can be by personal communication, or by an automated communication, such as an email or text message generated by the network service provider and sent to the secondary user. The secondary user then accesses the sharing server 316 of the network service provider to gain access to replicated credentials of the subscriber. To the extent the secondary user is unable to access the mobile network, the sharing server 316 can be accessed by way of an alternative network. Referring to FIG. 3, a secondary user 322b can access the sharing server 316 by way of one or more of a local WiFi connection through the WAP 320, through the same carrier network using different credentials, through another carrier network or through a wired connection to the WAN 312.

The secondary user 322b obtains a copy of the replicated credentials from the sharing server 316, then proceeds to establish connection with the subscriber's carrier network 302a, using the replicated credentials. The secondary user device 322b communicates wirelessly with base station 306, providing appropriate information obtained through the replicated credentials. The network operator through one or more of the base station 306, the mobile switching center 308 and the various other network elements 310a, 310b, 310c authorizes and provides access to the subscriber's mobile network 302a. As disclosed herein the replicated subscriber credentials can include additional information identifying the secondary user to facilitate sharing of network resources.

It is understood that in at least some instances different mobile network providers collaborate, such that a subscriber to one network can access resources of another network. Under such scenarios, the subscriber's identity and consumption of network resources of the other network are shared with the subscriber's home network, allowing proper monitoring and tracking of network usage to support accurate invoices for services rendered, whether from the home subscriber's network, a collaborating network of another, or some combination of such networks.

Upon reviewing the aforementioned embodiments, it would be evident to an artisan with ordinary skill in the art that said embodiments can be modified, reduced, or enhanced without departing from the scope of the claims described below. For example, replicated credentials can be stored in a secondary user device either in software, or firmware. Such credentials can be provided through a separate process, not necessarily using the sharing server, (e.g., physically transferred) in order to provide a different measure of security in the interest of reducing vulnerability to unauthorized access or cloning. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
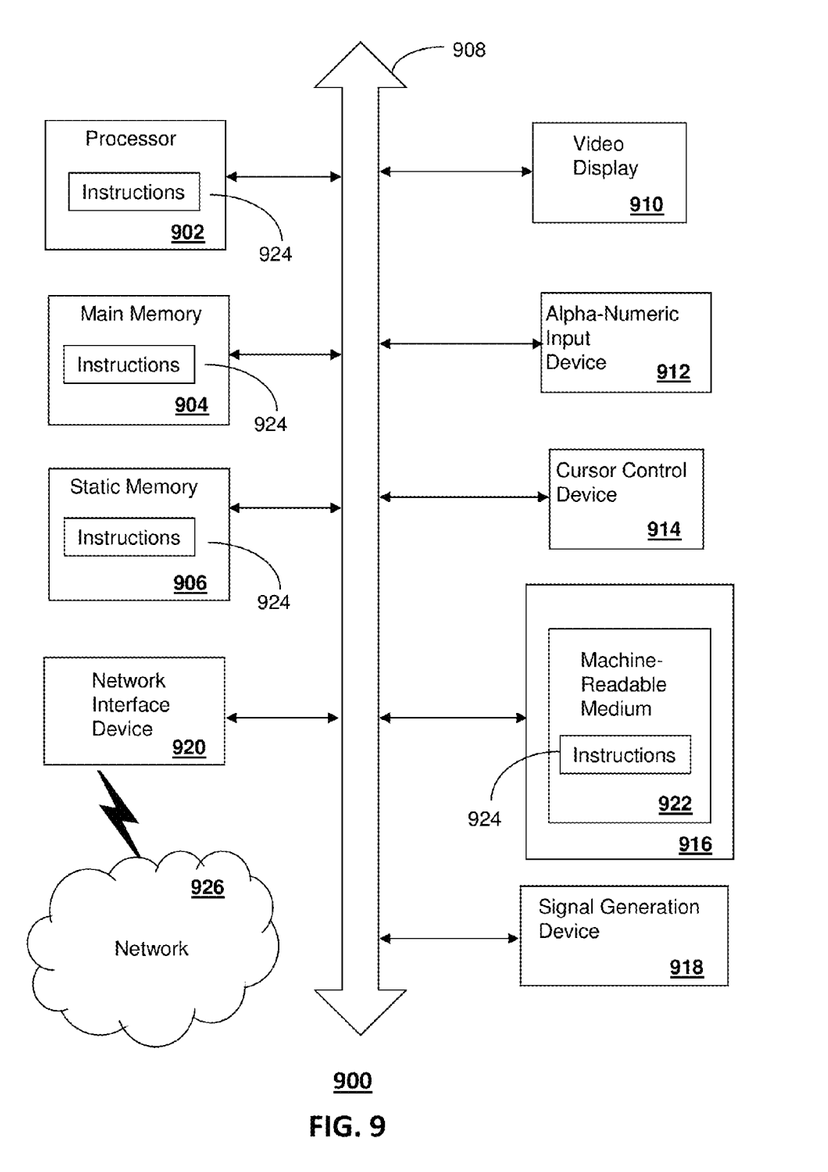
FIG. 9 is a diagrammatic representation of a machine in the form of a computer system within which a set of instructions, when executed, may cause the machine to perform any one or more of the processes described herein.

FIG. 9 depicts an exemplary diagrammatic representation of a machine in the form of a computer system 900 within which a set of instructions, when executed, may cause the machine to perform any one or more of the methods describe above. One or more instances of the machine can operate, for example, as the sharing server 130, 316, 808, the base station 306, the message service center 308, the mobile operator 806, the portal 402 and other devices of FIGS. 1-5 and 8. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communications device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a system comprising a processor, mobile network operator-approved credentials associated with a first mobile device, wherein pre-assigned mobile network resources are accessible by the first mobile device by way of the mobile network operator-approved credentials;
   replicating, by the system, the mobile network operator-approved credentials as replicated mobile network operator-approved credentials, wherein the replicated mobile network operator-approved credentials are stored at the system;
   receiving, by the system, a request from a second mobile device for access to the pre-assigned mobile network resources of the first mobile device;
   notifying, by the system, the second mobile device of an availability of the mobile network resources of the first mobile device for use by the second mobile device according to the mobile network operator-approved credentials associated with the first mobile device;
   receiving, by the system, an identification of the second mobile device;
   forwarding, by the system, a copy of the replicated mobile network operator-approved credentials to enable the second mobile device to access the pre-assigned mobile network resources; and
   reallocating, by the system, the pre-assigned mobile network resources to the second mobile device.

2. The method of claim 1, wherein the mobile network operator-approved credentials comprise subscriber identity module data.

3. The method of claim 1, further comprising storing, by the system, the replicated mobile network operator-approved credentials as stored replicated credentials.

4. The method of claim 3, wherein the stored replicated credentials are accessible via a wide area network distinguishable from a mobile network operated by a mobile network operator through which the pre-assigned mobile network resources are provided.

5. The method of claim 1, wherein the pre-assigned mobile network resources comprise one of a time allocation of a voice service of a mobile network operated by a mobile network operator through which the pre-assigned mobile network resources are provided, or a byte allocation of a data service of the mobile network.

6. The method of claim 1, further comprising receiving, by the system, identification of an authorized entity wherein forwarding the copy of the replicated mobile network operator-approved credentials is responsive to the identification of the second mobile device corresponding to the authorized entity.

7. The method of claim 1, further comprising determining, by the system, expiration criteria, wherein shared access to the pre-assigned mobile network resources is prohibited responsive to satisfaction of the expiration criteria.

8. A system, comprising:
   a memory to store instructions; and
   a processor coupled to the memory, wherein the processor, responsive to executing the instructions, performs operations comprising:
     receiving network operator-approved credentials associated with a first communications device, wherein pre-assigned network resources are accessible by the first communications device by way of the network operator-approved credentials;
     replicating the network operator-approved credentials as replicated network operator-approved credentials, wherein the replicated network operator-approved credentials are stored at the system;
     notifying a second communications device of an availability of the pre-assigned network resources of the first communications device for use by the second communications device according to the network operator-approved credentials associated with the first communications device;
     receiving a request from the second communications device for access to the pre-assigned network resources of the first communications device;
     receiving an identification of the second communications device;

forwarding a copy of the replicated network operator-approved credentials to enable the second communications device to access the pre-assigned network resources; and reallocating the pre-assigned network resources to the second communications device.

9. The system of claim 8, wherein the forwarding of the copy is performed without communicating with the first communications device after the receiving of the network operator-approved credentials.

10. The system of claim 9, wherein the replicated network operator-approved credentials are accessible via a wide area network distinguishable from an operator-managed network through which the pre-assigned network resources are provided.

11. The system of claim 8, wherein the network resources comprise one of a time allocation of a voice service of an operator-managed network through which the pre-assigned network resources are provided, or a byte allocation of a data service of the operator-managed network.

12. The system of claim 8, wherein the operations further comprise receiving identification of an authorized entity wherein forwarding the copy of the replicated network operator-approved credentials is responsive to the identification of the second communications device corresponding to the authorized entity.

13. The system of claim 8, wherein the operations further comprise determining expiration criteria, wherein shared access to pre-assigned network resources is prohibited responsive to satisfaction of the expiration criteria.

14. The system of claim 8, wherein the network operator-approved credentials comprise subscriber identity module data.

15. A non-transitory, machine-readable storage medium, comprising instructions, wherein responsive to executing the instructions, a processor performs operations comprising:

receiving network operator-approved credentials associated with a first communications device, wherein pre-assigned network resources are accessible by the first communications device by way of the network operator-approved credentials;

replicating the network operator-approved credentials as replicated network operator-approved credentials, wherein the replicated network operator-approved credentials are stored at a sharing server;

notifying a second communications device of an availability of the pre-assigned network resources of the first communications device for use by the second communications device according to the network operator-approved credentials associated with the first communications device;

receiving a request from the second communications device for access to the pre-assigned network resources of the first communications device;

forwarding a copy of the replicated network operator-approved credentials to enable the second communications device to access the pre-assigned network resources; and reallocating at least some of the pre-assigned network resources to the second communications device.

16. The non-transitory, machine-readable storage medium of claim 15, wherein the operations further comprise storing the replicated network operator-approved credentials as stored replicated credentials.

17. The non-transitory, machine-readable storage medium of claim 16, wherein the stored replicated credentials are accessible via a wide area network distinguishable from an operator-managed network through which the pre-assigned network resources are provided.

18. The non-transitory, machine-readable storage medium of claim 15, wherein the network resources comprise one of a time allocation of a voice service of an operator-managed network through which the pre-assigned network resources are provided, or a byte allocation of a data service of the operator-managed network.

19. The non-transitory, machine-readable storage medium of claim 15, wherein the operations further comprise determining expiration criteria, wherein shared access to pre-assigned network resources is prohibited responsive to satisfaction of the expiration criteria.

20. The non-transitory, machine-readable storage medium of claim 15, wherein the network operator-approved credentials comprise subscriber identity module data.

* * * * *